(12) United States Patent
Krishnan Gorumkonda et al.

(10) Patent No.: US 11,816,773 B2
(45) Date of Patent: Nov. 14, 2023

(54) MUSIC REACTIVE ANIMATION OF HUMAN CHARACTERS

(71) Applicant: Snap Inc., Santa Monica, CA (US)

(72) Inventors: Gurunandan Krishnan Gorumkonda, Seattle, WA (US); Hsin-Ying Lee, Sunnyvale, CA (US); Jie Xu, Cambridge, MA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/487,558

(22) Filed: Sep. 28, 2021

(65) Prior Publication Data
US 2022/0101586 A1   Mar. 31, 2022

Related U.S. Application Data

(60) Provisional application No. 63/085,755, filed on Sep. 30, 2020.

(51) Int. Cl.
G06T 13/20        (2011.01)
G06N 3/08         (2023.01)
(Continued)

(52) U.S. Cl.
CPC .......... G06T 13/205 (2013.01); G06N 3/044 (2023.01); G06N 3/045 (2023.01); G06N 3/08 (2013.01);
(Continued)

(58) Field of Classification Search
CPC .......... G06N 3/044; G06N 3/045; G06N 3/08; G06N 3/02; G06T 13/205; G06T 13/80;
(Continued)

(56) References Cited

U.S. PATENT DOCUMENTS 6,285,380 B1   9/2001   Perlin et al.
6,456,334 B1   9/2002   Duhault
(Continued)

FOREIGN PATENT DOCUMENTS

CN   114503165 A      5/2022
DE   102012111304 A1  5/2014
(Continued)

OTHER PUBLICATIONS

"International Application Serial No. PCT/US2021/052364, International Search Report dated Dec. 23, 2021", 4 pgs.
(Continued)

*Primary Examiner* — Xilin Guo
(74) *Attorney, Agent, or Firm* — Schwegman Lundberg & Woessner, P.A.

(57) ABSTRACT

Example methods for generating an animated character in dance poses to music may include generating, by at least one processor, a music input signal based on an acoustic signal associated with the music, and receiving, by the at least one processor, a model output signal from an encoding neural network. A current generated pose data is generated using a decoding neural network, the current generated pose data being based on previous generated pose data of a previous generated pose, the music input signal, and the model output signal. An animated character is generated based on a current generated pose data; and the animated character caused to be displayed by a display device.

20 Claims, 10 Drawing Sheets

(51) Int. Cl.
*G06T 13/40* (2011.01)
*G06T 13/80* (2011.01)
*G06N 3/044* (2023.01)
*G06N 3/045* (2023.01)

(52) U.S. Cl.
CPC .............. *G06T 13/40* (2013.01); *G06T 13/80* (2013.01); *G10H 2210/031* (2013.01)

(58) Field of Classification Search
CPC ................... G06T 13/40; G06T 19/006; G06T 2207/20081; G10H 2210/031; G06F 3/011; G06F 3/017; G06V 20/20; G06V 40/28
See application file for complete search history.

(56) References Cited

U.S. PATENT DOCUMENTS

| | | |
|---|---|---|
| 6,552,729 B1 | 4/2003 | Di Bernardo et al. |
| 6,600,491 B1 | 7/2003 | Szeliski et al. |
| 7,472,910 B1 | 1/2009 | Okada et al. |
| 9,358,456 B1 | 6/2016 | Challinor et al. |
| 9,753,925 B2 | 9/2017 | Cremer et al. |
| 9,789,392 B1 | 10/2017 | Lotzer |
| 9,827,496 B1 | 11/2017 | Zinno |
| 10,535,174 B1 | 1/2020 | Rigiroli et al. |
| 11,176,723 B2 | 11/2021 | Krishnan Gorumkonda et al. |
| 11,222,455 B2 | 1/2022 | Krishnan Gorumkonda et al. |
| 11,282,253 B2 | 3/2022 | Krishnan Gorumkonda et al. |
| 11,348,297 B2 | 5/2022 | Krishnan Gorumkonda et al. |
| 11,670,027 B2 | 6/2023 | Krishnan Gorumkonda et al. |
| 2003/0179204 A1 | 9/2003 | Mochizuki et al. |
| 2006/0274070 A1 | 12/2006 | Herman et al. |
| 2010/0082345 A1 | 4/2010 | Wang et al. |
| 2011/0293144 A1 | 12/2011 | Rahardja et al. |
| 2012/0086855 A1* | 4/2012 | Xu ........................ G06T 13/205 348/E9.034 |
| 2012/0130717 A1 | 5/2012 | Xu et al. |
| 2012/0143358 A1 | 6/2012 | Adams et al. |
| 2013/0069957 A1 | 3/2013 | Xie et al. |
| 2015/0057779 A1 | 2/2015 | Saungsomboon et al. |
| 2017/0206697 A1 | 7/2017 | Mckenzie et al. |
| 2017/0285918 A1 | 10/2017 | Shah et al. |
| 2019/0026932 A1 | 1/2019 | Kishi et al. |
| 2019/0043239 A1 | 2/2019 | Goel et al. |
| 2019/0079597 A1 | 3/2019 | Kada et al. |
| 2019/0258932 A1* | 8/2019 | Kang ..................... G06N 3/045 |
| 2020/0167984 A1* | 5/2020 | Cappello ................ G06T 19/00 |
| 2020/0294299 A1 | 9/2020 | Rigiroli et al. |
| 2020/0342646 A1* | 10/2020 | Wang ...................... G06T 13/40 |
| 2021/0097742 A1 | 4/2021 | Krishnan Gorumkonda et al. |
| 2021/0097743 A1 | 4/2021 | Krishnan Gorumkonda et al. |
| 2021/0097744 A1 | 4/2021 | Gorumkonda et al. |
| 2021/0097746 A1 | 4/2021 | Krishnan Gorumkonda et al. |
| 2021/0312682 A1 | 10/2021 | Krishnan Gorumkonda et al. |
| 2021/0312690 A1 | 10/2021 | Krishnan Gorumkonda et al. |
| 2022/0137724 A1 | 5/2022 | Schliemann et al. |
| 2022/0148246 A1 | 5/2022 | Krishnan Gorumkonda et al. |
| 2023/0024562 A1 | 1/2023 | Krishnan Gorumkonda et al. |
| 2023/0033694 A1* | 2/2023 | McDonald ............. G06N 3/084 |

FOREIGN PATENT DOCUMENTS

| | | |
|---|---|---|
| RU | 2708027 | 12/2019 |
| WO | WO-2008087621 A1 | 7/2008 |
| WO | WO-2021067988 A1 | 4/2021 |
| WO | WO-2022072328 A1 | 4/2022 |

OTHER PUBLICATIONS

"International Application Serial No. PCT/US2021/052364, Written Opinion dated Dec. 23, 2021", 6 pgs.

"U.S. Appl. No. 16/588,329, 312 Amendment filed Jun. 3, 2021", 2 pgs.

"U.S. Appl. No. 16/588,329, Corrected Notice of Allowability dated Nov. 16, 2021", 3 pgs.

"U.S. Appl. No. 16/588,329, Non Final Office Action dated Nov. 10, 2020", 15 pgs.

"U.S. Appl. No. 16/588,329, Notice of Allowance dated Mar. 3, 2021", 9 pgs.

"U.S. Appl. No. 16/588,329, Notice of Allowance dated Nov. 5, 2021", 6 pgs.

"U.S. Appl. No. 16/588,329, PTO Response to Rule 312 Communication dated Jun. 3, 2021", 2 pgs.

"U.S. Appl. No. 16/588,329, Response filed Feb. 10, 2021 to Non Final Office Action dated Nov. 10, 2020", 11 pgs.

"U.S. Appl. No. 16/588,373, Advisory Action dated Dec. 16, 2020", 5 pgs.

"U.S. Appl. No. 16/588,373, Corrected Notice of Allowability dated Jun. 16, 2021", 2 pgs.

"U.S. Appl. No. 16/588,373, Corrected Notice of Allowability dated Oct. 27, 2021", 2 pgs.

"U.S. Appl. No. 16/588,373, Final Office Action dated Oct. 23, 2020", 26 pgs.

"U.S. Appl. No. 16/588,373, Non Final Office Action dated Sep. 15, 2020", 19 pgs.

"U.S. Appl. No. 16/588,373, Notice of Allowance dated Mar. 22, 2021", 11 pgs.

"U.S. Appl. No. 16/588,373, Notice of Allowance dated Aug. 25, 2021", 11 pgs.

"U.S. Appl. No. 16/588,373, Response filed Oct. 12, 2020 to Non Final Office Action dated Sep. 15, 2020", 10 pgs.

"U.S. Appl. No. 16/588,373, Response filed Dec. 8, 2020 to Final Office Action dated Oct. 23, 2020", 10 pgs.

"U.S. Appl. No. 16/588,412, Final Office Action dated May 17, 2021", 31 pgs.

"U.S. Appl. No. 16/588,412, Non Final Office Action dated Mar. 17, 2021", 30 pgs.

"U.S. Appl. No. 16/588,412, Notice of Allowance dated Jan. 28, 2022", 11 pgs.

"U.S. Appl. No. 16/588,412, Notice of Allowance dated Oct. 4, 2021", 10 pgs.

"U.S. Appl. No. 16/588,412, Response filed Apr. 19, 2021 to Non Final Office Action dated Mar. 17, 2021", 12 pgs.

"U.S. Appl. No. 16/588,412, Response filed Sep. 17, 2021 to Final Office Action dated May 17, 2021", 12 pgs.

"U.S. Appl. No. 16/588,412, Supplemental Notice of Allowability dated Feb. 10, 2022", 3 pgs.

"U.S. Appl. No. 16/588,446, Non Final Office Action dated Mar. 24, 2021", 20 pgs.

"U.S. Appl. No. 16/588,446, Notice of Allowance dated Jul. 14, 2021", 9 pgs.

"U.S. Appl. No. 16/588,446, Response filed Jun. 24, 2021 to Non Final Office Action dated Mar. 24, 2021", 10 pgs.

"U.S. Appl. No. 16/588,446, Supplemental Notice of Allowability dated Jul. 26, 2021", 2 pgs.

"U.S. Appl. No. 17/350,954, Advisory Action dated Nov. 22, 2022", 4 pgs.

"U.S. Appl. No. 17/350,954, Examiner Interview Summary dated Apr. 21, 2023", 2 pgs.

"U.S. Appl. No. 17/350,954, Final Office Action dated Sep. 9, 2022", 25 pgs.

"U.S. Appl. No. 17/350,954, Non Final Office Action dated Jan. 26, 2023", 25 pgs.

"U.S. Appl. No. 17/350,954, Non Final Office Action dated May 11, 2022", 21 pgs.

"U.S. Appl. No. 17/350,954, Response filed Apr. 24, 2023 to Non Final Office Action dated Jan. 26, 2023", 10 pgs.

"U.S. Appl. No. 17/350,954, Response filed Aug. 11, 2022 to Non Final Office Action dated May 11, 2022", 9 pgs.

"U.S. Appl. No. 17/350,954, Response filed Nov. 9, 2022 to Final Office Action dated Sep. 9, 2022", 8 pgs.

"U.S. Appl. No. 17/350,975, Examiner Interview Summary dated May 3, 2023", 2 pgs.

"U.S. Appl. No. 17/350,975, Examiner Interview Summary dated Dec. 13, 2022", 2 pgs.

(56) References Cited

OTHER PUBLICATIONS

"U.S. Appl. No. 17/350,975, Final Office Action dated Feb. 1, 2023", 28 pgs.
"U.S. Appl. No. 17/350,975, Non Final Office Action dated Sep. 8, 2022", 19 pgs.
"U.S. Appl. No. 17/350,975, Response filed May 1, 2023 to Final Office Action dated Feb. 1, 2023", 12 pgs.
"U.S. Appl. No. 17/350,975, Response filed Dec. 8, 2022 to Non Final Office Action dated Sep. 8, 2022", 12 pgs.
"U.S. Appl. No. 17/526,540, Non Final Office Action dated Sep. 23, 2022", 15 pgs.
"U.S. Appl. No. 17/526,540, Notice of Allowability dated May 3, 2023", 2 pgs.
"U.S. Appl. No. 17/526,540, Notice of Allowance dated Jan. 25, 2023", 10 pgs.
"U.S. Appl. No. 17/526,540, Response filed Dec. 20, 2022 to Non Final Office Action dated Sep. 23, 2022", 9 pgs.
"U.S. Appl. No. 17/804,430, Non Final Office Action dated Feb. 2, 2023", 18 pgs.
"U.S. Appl. No. 17/804,430, Preliminary Amendment filed Oct. 11, 2022", 10 pgs.
"U.S. Appl. No. 17/804,430, Response filed May 2, 2023 to Non Final Office Action dated Feb. 2, 2023", 11 pgs.
"Forward Kinematics", Wikipedia, [Online] Retrieved from the Internet: <URL: https://web.archive.org/web/20181115030912/https://en.wikipedia.org/wiki/Forward_kinematics>, (2018), 4 pgs.
"International Application Serial No. PCT/US2020/070586, International Preliminary Report on Patentability dated Apr. 14, 2022", 12 pgs.
"International Application Serial No. PCT/US2020/070586, International Search Report dated Mar. 9, 2021", 7 pgs.
"International Application Serial No. PCT/US2020/070586, Invitation to Pay Additional Fees dated Dec. 11, 2020", 13 pgs.
"International Application Serial No. PCT/US2020/070586, Written Opinion dated Mar. 9, 2021", 10 pgs.
"International Application Serial No. PCT/US2021/052364, International Preliminary Report on Patentability dated Apr. 13, 2023", 8 pgs.
"Tempi for iPhone/iPad/Mac—Improve your rhythm and tempo.", [Online]. Retrieved from the Internet: <https://madebywindmill.com/tempi/>, (2020), 3 pgs.
Bock, Sebastian, et al., "Accurate Tempo Estimation based on Recurrent Neural Networks and Resonating Comb Filters", Proceedings of the 16th ISMIR Conference, Malaga, Spain, (2015), 625-631.
Ellis, Daniel P.W, "Beat Tracking by Dynamic Programming", Journal of New Music Research, 36:1, 51-60, DOI: 10.1080/09298210701653344, (2007), 21 pgs.
Shiratori, et al., "Dancing-to-Music Character Animation", Eurographics 2006, vol. 25., No. 3, (2006), 10 pgs.
"U.S. Appl. No. 17/804,430, Notice of Allowance dated Jun. 13, 2023", 9 pgs.
"U.S. Appl. No. 17/350,975, Notice of Allowance dated Jun. 22, 2023", 9 pgs.
"U.S. Appl. No. 17/350,954, Final Office Action dated Jun. 30, 2023", 29 pgs.
"Chinese Application Serial No. 202180067185.6, Notification to Make Rectification (210302) dated Jun. 13, 2023", 1 pg.

\* cited by examiner

# MUSIC REACTIVE ANIMATION OF HUMAN CHARACTERS

PRIORITY

This application claims the benefit of priority to U.S. Provisional Patent Application Ser. No. 63/085,755, filed Sep. 30, 2020, which is incorporated by reference herein in its entirety.

BACKGROUND

Humans are the only species known to express themselves through movement and music. It is a uniquely human form of communication and creativity. Having computer animated avatars of a person reacting to the environment in real time allows people to share their experience and connect with each other.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Aspects of the present disclosure include systems, methods, techniques, instruction sequences, and computing machine program products for synthesize the choreography moves that are synchronized with music, that is realistic, creative, and reactive to the music by machine learning. This can be used to generate graphical characters (e.g., avatars) that dance to music in real time. For example, while music is playing in an environment being captured using a video capturing device (e.g., a mobile device executing an augmented reality video capture application), a foreground character is generated and displayed, the foregoing character realistically and creatively dancing to the music in real time. Another example use would be for those interested in creating new dance choreography, in which case artificial intelligence is deployed to assist the artist in choreographing dances to music in an organic manner.

Another aspect of the disclosure includes wherein the encoding neural network and the decoding neural network are based on a conditional recursive neural network model.

A third aspect includes where the model output signal is a unit normal distribution or Gaussian distribution.

A fourth aspect includes generating the current pose data further comprises generating a mean and a standard deviation of the model output signal.

A fifth aspect includes training, by at least one processor, the encoding neural network model to generate the model output signal using test previous pose data, the music input signal, and test current pose data, wherein the test previous pose data is based on the current pose data. During training, a batch of dance sequences is sampled. The length of the dance sequences is predetermined. The dance sequences may be of equal length. All music features and input and output poses are standardized to be zero mean and one deviation along each axis.

Figure 1:
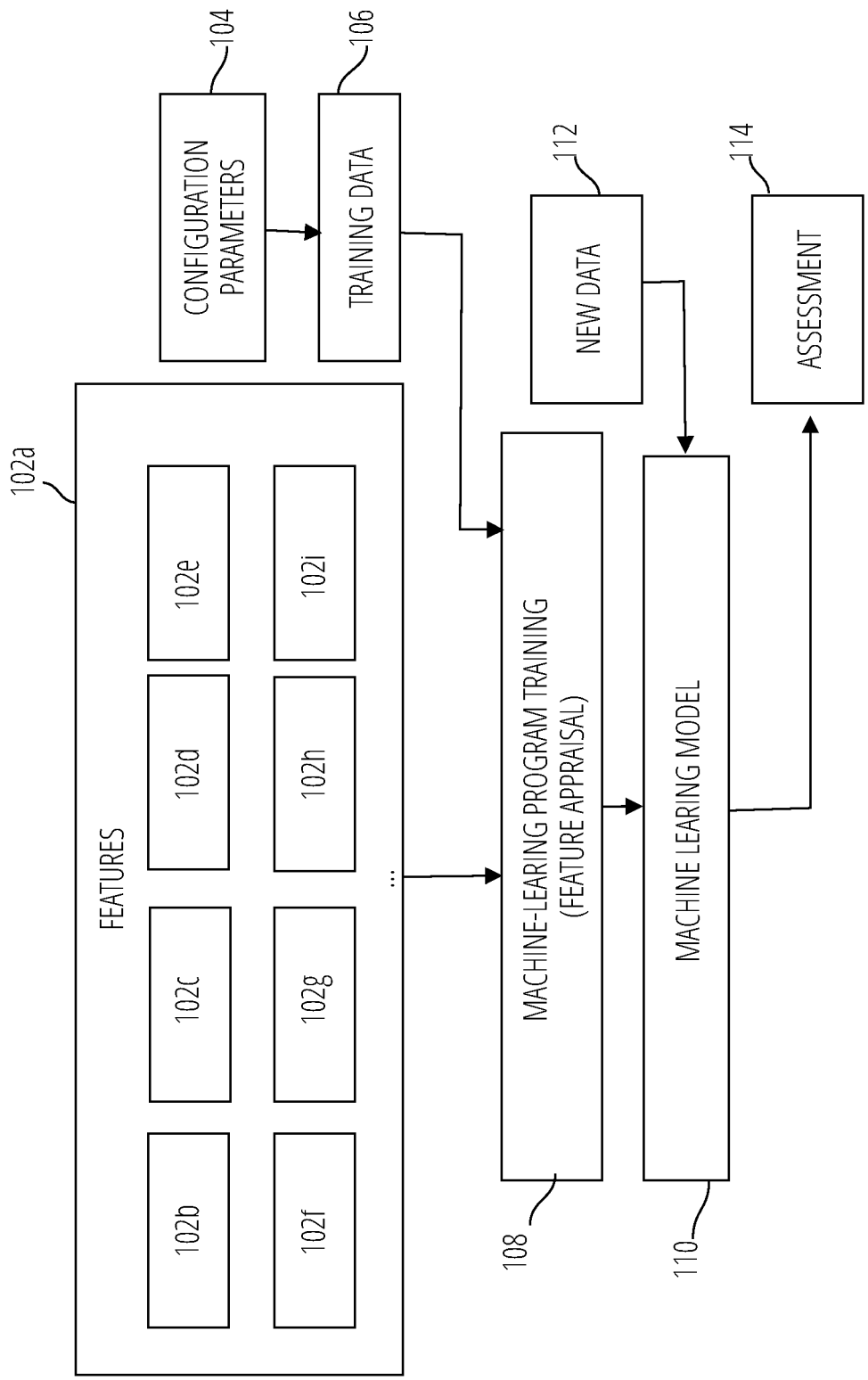
FIG. 1 illustrates a block diagram of a general machine learning model.

FIG. 1 illustrates one method of the training and use of a machine-learning program, according to some examples. In some examples, machine-learning programs (MLPs), also referred to as machine-learning algorithms or tools, are used to perform operations associated with searches.

Machine Learning (ML) is a technological methods and paradigms that provide computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 110 from example training data 106 to make data-driven predictions or decisions expressed as outputs or assessments 114. Although examples are presented with respect to a few machine-learning tools, the principles presented herein may be applied to other machine-learning tools.

Data representation refers to the method of organizing the data for storage on a computer system, including the structure for the identified features and their values. In ML, it is typical to represent the data in vectors or matrices of two or more dimensions. When dealing with large amounts of data and many features, data representation is important so that the training can identify the correlations within the data.

There are two common modes for ML: supervised ML and unsupervised ML. Supervised ML uses prior knowledge (e.g., examples that correlate inputs to outputs or outcomes)

to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are, Logistic Regression (LR), Naive-Bayes, Random Forest (RF), neural networks (NN), deep neural networks (DNN), matrix factorization, and Support Vector Machines (SVM). A self-supervised method such as using a long-short term memory (LSTM) autoencoder model may also be used. In some examples the model could use either a separate LSTM encoder 206 or LSTM decoder 216. In other examples a shared LSTM is used for both encoding and decoding and output from the embedding model that is conditioned on a conditional variational auto encoder (VAE).

Some common tasks for unsupervised ML include clustering, representation learning, and density estimation. Some examples of commonly used unsupervised-ML algorithms are K-means clustering, principal component analysis, and autoencoders.

The training data 106 comprises examples of values for the features 102a. In some examples, the training data 106 comprises labeled data with examples of values for the features 102a and labels indicating the outcome, such as valid or invalid email address, email address bounced, typographical errors, etc. The machine-learning algorithms use the training data 106 to find correlations among identified features 102a that affect the outcome. A feature 102a is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

In one example, the features 102a may be of several types and may include one or more of words of the relative location of a pose 102b, joint representation for 2D models 102c, joint representation for 3d models 102d, music sampling rate 102e, delta values of feature vectors of the music 102f, latent space representation of possible poses 102g, initial pose 102h and current pose 102i.

During training 108 the ML algorithm analyzes the training data 106 based on identified features 102a and configuration parameters 104 defined for the training 108. The result of the training 108 is an ML model 110 that is capable of taking inputs to produce assessments.

Training an ML algorithm involves analyzing large amounts of data (e.g., from several gigabytes to a terabyte or more) to find data correlations. The ML algorithms utilize the training data 106 to find correlations among the identified features 102a that affect the outcome or assessment 114.

In some examples, the training data 106 includes labeled data, which is known data for one or more identified features 102a and one or more outcomes, such as music inputs and generating unique dance sequence set to ambient music, and the ability to generate a new and different unique dance sequence for the same music input.

The ML algorithms usually explore many possible functions and parameters before finding what the ML algorithms identify to be the best correlations within the data; therefore, training 108 may make use of large amounts of computing resources and time.

Many ML algorithms include configuration parameters 104, and the more complex the ML algorithm, the more parameters there are that are available to the user. The configuration parameters 104 define variables for an ML algorithm in the search for the best ML model. The training parameters include model parameters and hyperparameters. Model parameters are learned from the training data, whereas hyperparameters are not learned from the training data, but instead are provided to the ML algorithm.

Some examples of model parameters include maximum model size, maximum number of passes over the training data, data shuffle type, regression coefficients, decision tree split locations, and the like. Hyperparameters may include the number of hidden layers in a neural network, the number of hidden nodes in each layer, the learning rate (with various adaptation schemes for the learning rate), the regularization parameters, types of nonlinear activation functions, and the like. Finding the correct (or the best) set of hyperparameters can be a very time-consuming task that makes use of a large amount of computer resources.

When the ML model 110 is used to perform an assessment 114, new data 112 is provided as an input to the ML model 110, and the ML model 110 generates the assessment 114 as output. For example, when a message is checked for an action item, the machine-learning program utilizes the message content and message metadata to determine if there is a request for an action in the message.

Feature extraction is a process to reduce the number of resources required to describe a large set of data. When performing analysis of complex data, one of the major problems is one that stems from the number of variables involved. Analysis with a large number of variables generally requires a large amount of memory and computational power, and it may cause a classification algorithm to overfit to training samples and generalize poorly to new samples. Feature extraction includes constructing combinations of variables to get around these large-data-set problems while still describing the data with sufficient accuracy for the desired purpose.

In some examples, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same, or a similar, amount of information.

Figure 2:
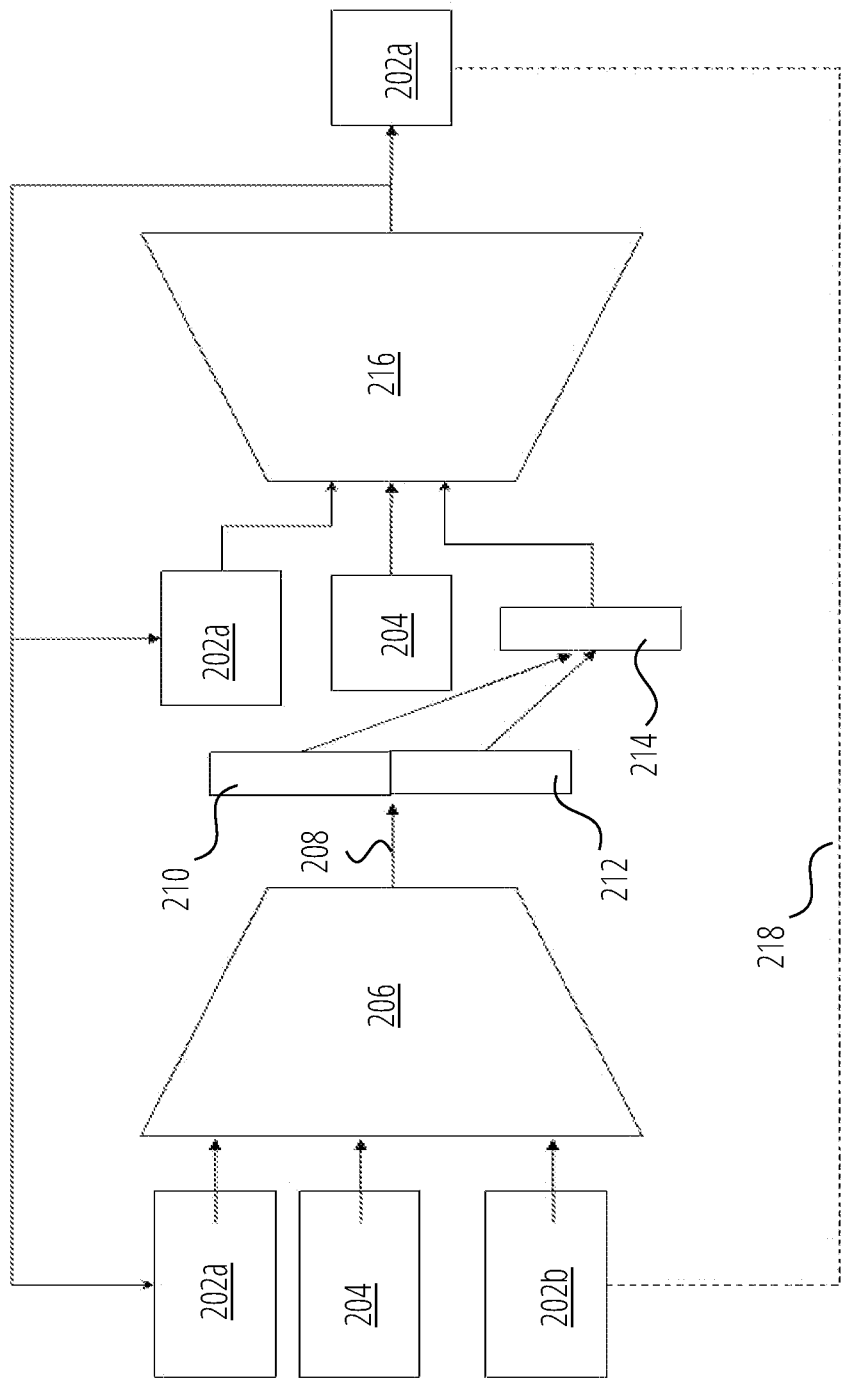
FIG. 2 illustrates a block diagram of an aspect of the subject matter in accordance with some examples.

FIG. 2 shows some examples that use a LS™ auto encoder ML model. The design of the model can use a conditional recurrent variational auto encoder (VAE) to synthesis a dance sequence for the music. Such a model is lightweight and therefore could be run on client device devices, such as smartphones and other such portable devices. During the working stage only the decoder 216 side of the model is used, but during the training stage both the encoder 206 side and the decoder 216 are used.

Each dance sequence $D^k$ is a pair of music sequence, which can be described as $M^k \in R^{T \times m}$, and pose sequence, which can be described as $P^k \in R^{(T+1) \times n}$. Here T is the number of frames, m is a representation of the dimension or dimensions of the music features and n is a representation of the dimension or dimensions of the pose features of interest. The number of frames (T) may be 30 frames per second (fps) for example or set to a different frame rate if so desired. Pose sequence is made of current or generated poses 202a, previous poses 202b, and at the start of sequence it also contains an initial pose (not pictured). Pose sequence is one element longer than music sequence since it contains the initial pose of the dance. The initial pose can take the place of the previous pose 202b at the start of a pose sequence.

Music sequence is computed into a feature vector which takes the music at a sample rate for the raw music and computes it into a raw music signal 204. This process can be done in real time as music is being played in the environment. This music signal 204 is used as an input signal both during the training stage and the during the actual working stage.

Pose sequence gives the position that an animated character is set to take. The animated character in some embodiments can be a humanoid figure that represents the users. The animated character is generated to take the position that the pose generated by the pose sequence sets. The post is a made up of joints that are connected by frames. At least one frame is connected per joint, and the vector given to the frame informs the direction the frame is relative to the joint. The representation is given for both 2D and 3D character relative to the location of the root joint on the animated character. The root joint can also be considered the hip joint for the animation. Other joints are described relative to the root joint. The number of joints for a 2D animation, may be different from the number of joints for 3D animation. For a 2D dataset the minimum number of joints used to represent a character is 24 joints. Whereas for a 3D dataset the minimum number of joints could be 26 if individual finger joints were removed from consideration.

The number of poses possible are correlated to the number of joints and the number of dimensions of movement the animated character is rendered in. For example, the 2D animation which has 25 joint-representation would have at least 50 possible poses from its current pose that could be considered for its next pose. Whereas a similar 3D animation which is based on the minimum number of joints could have 78 possible poses since it would have 26 joints to be considered in a representation of 3D space.

Another representation for 3D is joint quaternion representation [ $p^r, q^r, q^j$ ]], where $p^r \in \mathbb{R}^3$ is the world position for the root joint, $q^r \in \mathbb{R}^4$ is the quaternion of the root joint rotation, and $q^j \in \mathbb{R}^{25 \cdot 4}$ is the quaternions of the relative joint rotations to the parent joint.

Training phase, possible poses are characterized uses the encoder 206 to determine a set of latent space vectors which by finding the mean and the standard deviation of these outputs can be z input 214. The z input 214 provides the latent space from which the decoder can sample from when determining the new generated pose and allows for a randomization and creativity to be displayed in the dance. The output of the encoder is standardized to be zero mean 210 and to have a one deviation along each axis as standard 212.

These are fed into the z input 214 to allow for a Gaussian distribution of possible poses for the decoder 216 to randomly sample. Therefore, the same piece of music can have different dances generated in an auto-regressive manner using a is a recurrent process. In the training phase the music signal 204 can be iteratively input the test previous pose 202b into the model to determine a set of possible outputs that can be used as the current pose 202a. This test previous in the training model corresponds to a generated previous pose when the model has been trained. In that case the input is not iteratively used to determine the current pose 202a. The training model reserves as much of relevant pose information as possible in the encoding, and intelligently provides for poses that can seamlessly transition the new generated pose 202a from the previous pose 202b. The training gradually transitions from a teacher forcing training to an auto-regressive training. The input sequence of the poses is interleaved by ground-truth poses and self-generated poses [P1; P2; . . . ; Ps; Ps+1; . . . ; Ps+10; Ps+11; . . . ], where Pi is the self-generated poses (student forcing steps), and Pi is the ground-truth poses (teacher forcing steps). The student forcing steps s is 0 at the beginning of the training, and increase by a schedule $s = [0.002 t_e]$, where $t_e$ is the number of epochs. In each training epoch, a batch of dance sequence is sampled with equal length T from the dataset. For example, in a 2D dataset T=150 for t and T=300 for 3D dataset. All the music features and the poses input/output are standardized to be zero mean and one deviation along each axis.

By comparing the current pose 202a with the previous pose 202b a loss value 218 can be attributed to the difference between the two poses. This loss value describes how similar the two poses are. The generated previous pose can be the same pose that was generated at a time directly before the current time of interest. The generated previous pose is generated by the model in the same manner as the current pose if generated at time t=t−1 and the recursively used by the model in order to the pose at time t.

Figure 3:
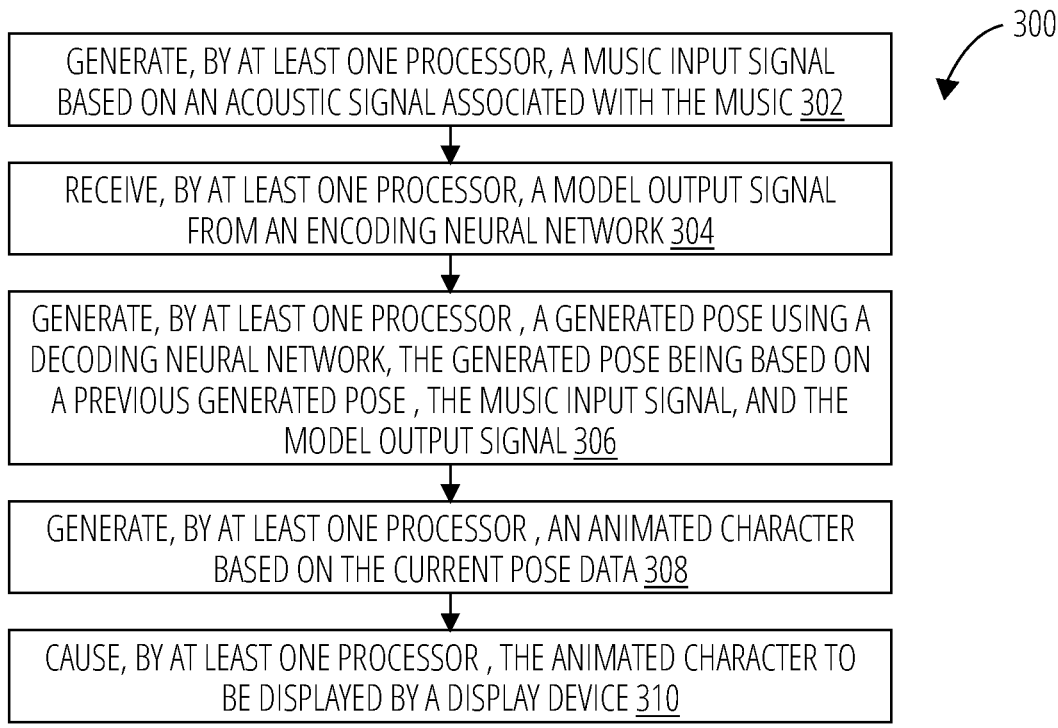
FIG. 3 illustrates flow diagram of a routine 300 for generating an animated character in a real time dance poses to music in accordance with some examples.

FIG. 3 outlines routine 300, which describes another alternative example for implementing a machine learning method which utilizes a recursive neural network and training model wherein the new pose is generated based on at least the previous output pose.

In block 302, routine 300 generates a music input signal based on an acoustic signal associated with the music. The music signal can be represented by a multidimensional vector. The multidimensional vector can include features based on Mel Frequency Cepstral Coefficients (MFCC), chromogram, onset, delta values, beat indicators, or any combination thereof. The music features equate to set frame rate. For example, the frame rate could be 30 fps, which allows for smooth video experience from one frame to the next. Higher frame rates can be used if desired in order to create slow motion or other effects.

In block 304, routine 300 receives a model output signal from an encoding neural network. This model output was defined in the training stage. The output from the decoder is used the input of the to the encoder to generate a next possible pose. All of these possible poses are standardized to be zero mean and at minimum one deviation along each axis. The latent space is output from the encoder with consideration providing a normalized distribution of possible poses for the encoder to sample from in the z input 214. The use of the z input 214 allows for the same music to have a different output pose and means that the system does only needs to have a past music data. The system can act reactively to an audio signal, regardless of the length of the audio signal. If the mean is farm from the standard normal distribution, then the decoder maybe encouraged to ignore the z input 214.

In block 306, routine 300 generates a generated pose using a decoding neural network, the generated pose being based on a previous generated pose data, the music input signal, and the model output signal.

In block 308, routine 300 generates an animated character based on the generated pose data. The current pose data is used to determine how the animated character should be displayed on the screen.

In block 310, routine 300 causes the animated character to be displayed by a display device. The display device can be a client device such as a smart phone, a computer, or other device.

Networked Computing Environment

Figure 4:
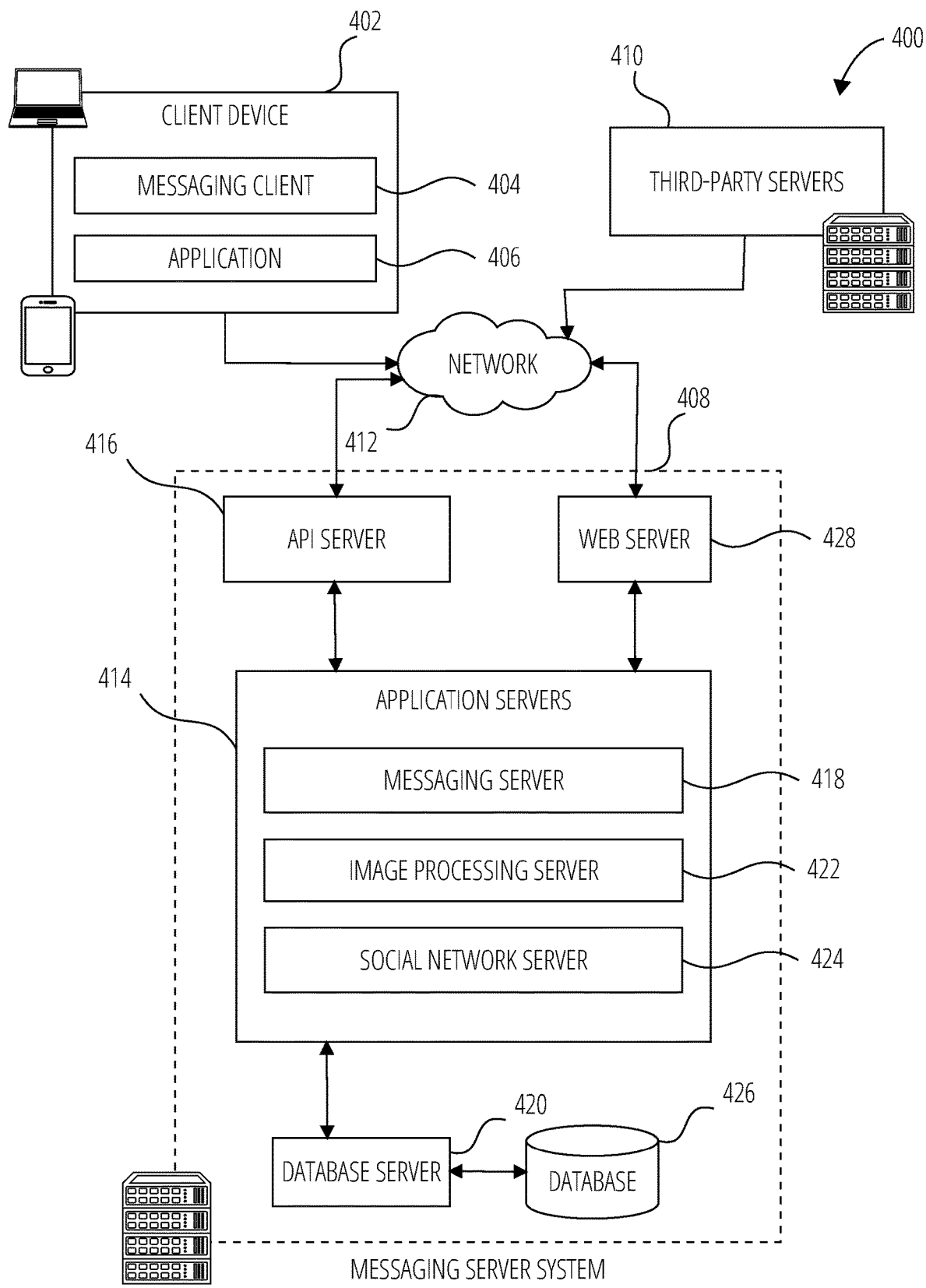
FIG. 4 is a diagrammatic representation of a networked environment in which the present disclosure may be deployed, in accordance with some examples.

FIG. 4 is a block diagram showing an example messaging system 400 for exchanging data (e.g., messages and associated content) over a network. The messaging system 400 includes multiple instances of a client device 402, each of which hosts a number of applications, including a messaging client 404 and other applications 406. Each messaging client 404 is communicatively coupled to other instances of the messaging client 404 (e.g., hosted on respective other client devices 402), a messaging server system 408 and third-party servers 410 via a network 412 (e.g., the Internet). A messaging client 404 can also communicate with locally-hosted applications 406 using Applications Program Interfaces (APIs). The animated character can be used within the messaging client 404.

A messaging client 404 is able to communicate and exchange data with other messaging clients 404 and with the messaging server system 408 via the network 412. The data exchanged between messaging clients 404, and between a messaging client 404 and the messaging server system 408, includes functions (e.g., commands to invoke functions) as well as payload data (e.g., text, audio, video, or other multimedia data).

The messaging server system 408 provides server-side functionality via the network 412 to a particular messaging client 404. While certain functions of the messaging system 400 are described herein as being performed by either a messaging client 404 or by the messaging server system 408, the location of certain functionality either within the messaging client 404 or the messaging server system 408 may be a design choice. For example, it may be technically preferable to initially deploy certain technology and functionality within the messaging server system 408 but to later migrate this technology and functionality to the messaging client 404 where a client device 402 has sufficient processing capacity.

The messaging server system 408 supports various services and operations that are provided to the messaging client 404. Such operations include transmitting data to, receiving data from, and processing data generated by the messaging client 404. This data may include message content, client device information, geolocation information, media augmentation and overlays, message content persistence conditions, social network information, and live event information, as examples. Data exchanges within the messaging system 400 are invoked and controlled through functions available via user interfaces (UIs) of the messaging client 404.

Turning now specifically to the messaging server system 408, an Application Program Interface (API) server 416 is coupled to, and provides a programmatic interface to, application servers 414. The application servers 414 are communicatively coupled to a database server 420, which facilitates access to a database 426 that stores data associated with messages processed by the application servers 414. Similarly, a web server 428 is coupled to the application servers 414 and provides web-based interfaces to the application servers 414. To this end, the web server 428 processes incoming network requests over the Hypertext Transfer Protocol (HTTP) and several other related protocols.

The Application Program Interface (API) server 416 receives and transmits message data (e.g., commands and message payloads) between the client device 402 and the application servers 414. Specifically, the Application Program Interface (API) server 416 provides a set of interfaces (e.g., routines and protocols) that can be called or queried by the messaging client 404 in order to invoke functionality of the application servers 414. The Application Program Interface (API) server 416 exposes various functions supported by the application servers 414, including account registration, login functionality, the sending of messages, via the application servers 414, from a particular messaging client 404 to another messaging client 404, the sending of media files (e.g., images or video) from a messaging client 404 to a messaging server 418, and for possible access by another messaging client 404, the settings of a collection of media data (e.g., story), the retrieval of a list of friends of a user of a client device 402, the retrieval of such collections, the retrieval of messages and content, the addition and deletion of entities (e.g., friends) to an entity graph (e.g., a social graph), the location of friends within a social graph, and opening an application event (e.g., relating to the messaging client 404).

The application servers 414 host a number of server applications and subsystems, including for example a messaging server 418, an image processing server 422, and a social network server 424. The messaging server 418 implements a number of message processing technologies and functions, particularly related to the aggregation and other processing of content (e.g., textual and multimedia content) included in messages received from multiple instances of the messaging client 404. As will be described in further detail, the text and media content from multiple sources may be aggregated into collections of content (e.g., called stories or galleries). These collections are then made available to the messaging client 404. Other processor and memory intensive processing of data may also be performed server-side by the messaging server 418, in view of the hardware requirements for such processing.

The application servers 414 also include an image processing server 422 that is dedicated to performing various image processing operations, typically with respect to images or video within the payload of a message sent from or received at the messaging server 418.

The social network server 424 supports various social networking functions and services and makes these functions and services available to the messaging server 418. To this end, the social network server 424 maintains and accesses an entity graph (not shown) within the database 426. Examples of functions and services supported by the social network server 424 include the identification of other users of the messaging system 400 with which a particular user has relationships or is "following," and also the identification of other entities and interests of a particular user.

Returning to the messaging client 404, features and functions of an external resource (e.g., an application 406 or applet) are made available to a user via an interface of the messaging client 404. In this context, "external" refers to the fact that the application 406 or applet is external to the messaging client 404. The external resource is often provided by a third party but may also be provided by the creator or provider of the messaging client 404. The messaging client 404 receives a user selection of an option to launch or access features of such an external resource. The external resource may be the application 406 installed on the client device 402 (e.g., a "native app"), or a small-scale version of the application (e.g., an "applet") that is hosted on the client device 402 or remote of the client device 402 (e.g., on third-party servers 410). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 404. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 404 determines whether the selected external resource is a web-based external resource or a locally-installed application 406. In some cases, applications 406 that are locally installed on the client device 402 can be launched independently of and separately from the messaging client 404, such as by selecting an icon, corresponding to the application 406, on a home screen of the client device 402. Small-scale versions of such applications can be launched or accessed via the messaging client 404 and, in some examples, no or limited portions of the small-scale application can be accessed outside of the messaging client 404. The small-scale application can be launched by the messaging client 404 receiving, from a third-party server 410 for example, a markup-language document associated with the small-scale application and processing such a document.

In response to determining that the external resource is a locally-installed application 406, the messaging client 404 instructs the client device 402 to launch the external resource by executing locally-stored code corresponding to the external resource. In response to determining that the external resource is a web-based resource, the messaging client 404 communicates with the third-party servers 410 (for example) to obtain a markup-language document corresponding to the selected external resource. The messaging client 404 then processes the obtained markup-language document to present the web-based external resource within a user interface of the messaging client 404.

The messaging client 404 can notify a user of the client device 402, or other users related to such a user (e.g., "friends"), of activity taking place in one or more external resources. For example, the messaging client 404 can provide participants in a conversation (e.g., a chat session) in the messaging client 404 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 404, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 404. The external resource can selectively include different media items in the responses, based on a current context of the external resource.

The messaging client 404 can present a list of the available external resources (e.g., applications 406 or applets) to a user to launch or access a given external resource. This list can be presented in a context-sensitive menu. For example, the icons representing different ones of the application 406 (or applets) can vary based on how the menu is launched by the user (e.g., from a conversation interface or from a non-conversation interface).

System Architecture

Figure 5:
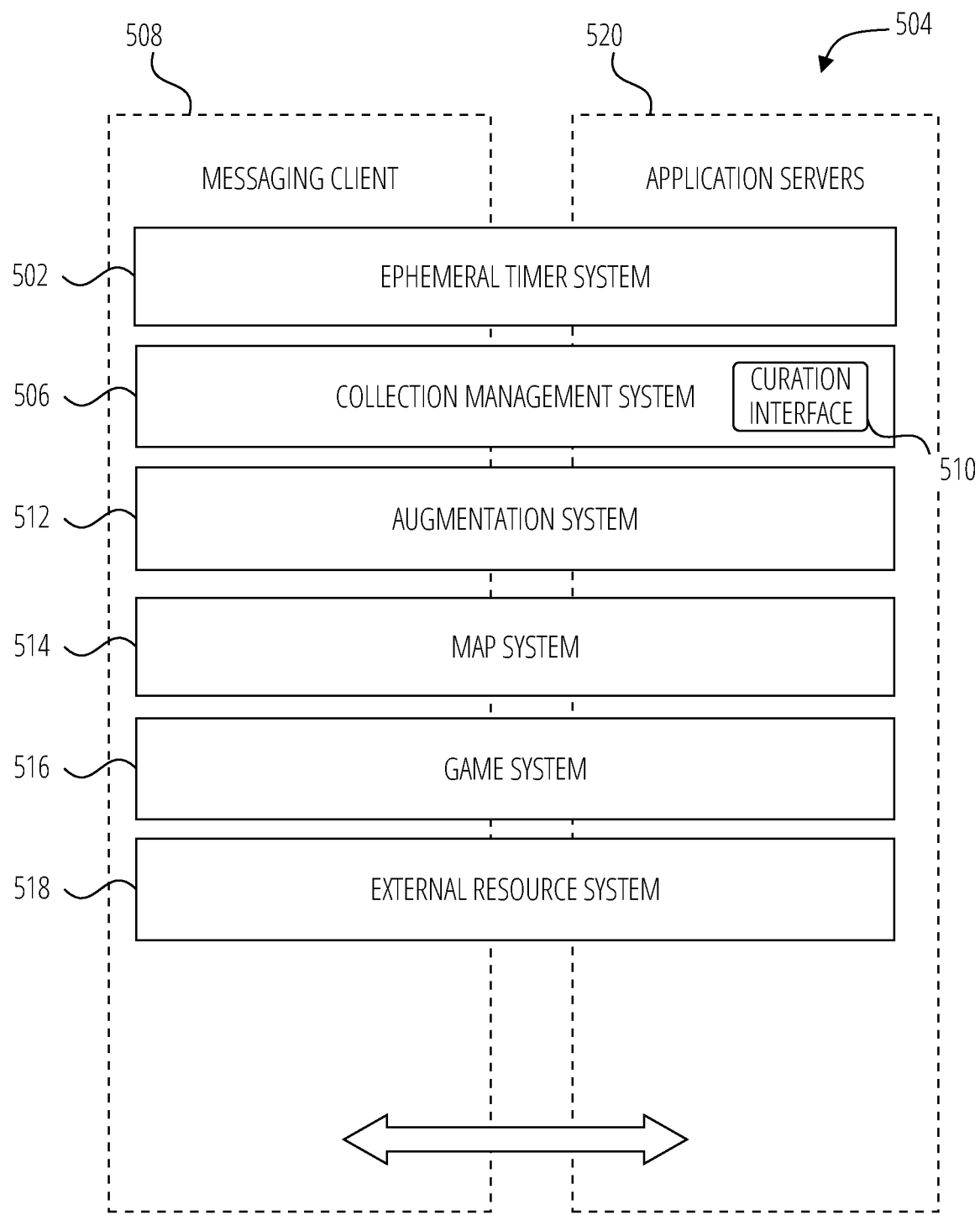
FIG. 5 is a diagrammatic representation of a messaging system, in accordance with some examples, that has both client-side and server-side functionality.

FIG. 5 is a block diagram illustrating further details regarding the messaging system 504, according to some examples. Specifically, the messaging system 504 is shown to comprise the messaging client 508 and the application servers 520. The messaging system 504 embodies a number of subsystems, which are supported on the client-side by the messaging client 508 and on the server-side by the application servers 520. These subsystems include, for example, an ephemeral timer system 502, a collection management system 506, an augmentation system 512, a map system 514, a game system 516, and an external resource system 518. The animated character can be sent by one of the messaging system subsystems such as the augmentation system or the messaging client to as a message to a client or third-party device.

The ephemeral timer system 502 is responsible for enforcing the temporary or time-limited access to content by the messaging client 508 and the messaging server 418. The ephemeral timer system 502 incorporates a number of timers that, based on duration and display parameters associated with a message, or collection of messages (e.g., a story), selectively enable access (e.g., for presentation and display) to messages and associated content via the messaging client 508. Further details regarding the operation of the ephemeral timer system 502 are provided below.

The collection management system 506 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 506 may also be responsible for publishing an icon that provides notification of the existence of a particular collection to the user interface of the messaging client 508.

The collection management system 506 furthermore includes a curation interface 510 that allows a collection manager to manage and curate a particular collection of content. For example, the curation interface 510 enables an event organizer to curate a collection of content relating to a specific event (e.g., delete inappropriate content or redundant messages). Additionally, the collection management system 506 employs machine vision (or image recognition technology) and content rules to automatically curate a content collection. In certain examples, compensation may be paid to a user for the inclusion of user-generated content into a collection. In such cases, the collection management system 506 operates to automatically make payments to such users for the use of their content.

The augmentation system 512 provides various functions that enable a user to augment (e.g., annotate or otherwise modify or edit) media content associated with a message. For example, the augmentation system 512 provides functions related to the generation and publishing of media overlays for messages processed by the messaging system 504. The augmentation system 512 operatively supplies a media overlay or augmentation (e.g., an image filter) to the messaging client 508 based on a geolocation of the client device 402. In another example, the augmentation system 512 operatively supplies a media overlay to the messaging client 508 based on other information, such as social network information of the user of the client device 402. A media overlay may include audio and visual content and visual effects. The media overlay may also include the animated character dancing to music where in the dance is real time generated. Examples of audio and visual content include pictures, texts, logos, animations, and sound effects. An example of a visual effect includes color overlaying. The audio and visual content or the visual effects can be applied to a media content item (e.g., a photo) at the client device 402. For example, the media overlay may include text or image that can be overlaid on top of a photograph taken by the client device 402. In another example, the media overlay includes an identification of a location overlay (e.g., Venice beach), a name of a live event, or a name of a merchant overlay (e.g., Beach Coffee House). In another example, the augmentation system 512 uses the geolocation of the client device 402 to identify a media overlay that includes the name of a merchant at the geolocation of the client device 402. The media overlay may include other indicia associated with the merchant. The media overlays may be stored in the database 618 and accessed through the database server 420.

In some examples, the augmentation system 512 provides a user-based publication platform that enables users to select a geolocation on a map and upload content associated with the selected geolocation. The user may also specify circumstances under which a particular media overlay should be offered to other users. The augmentation system 512 generates a media overlay that includes the uploaded content and associates the uploaded content with the selected geolocation.

In other examples, the augmentation system 512 provides a user with the ability to insert a dancing animation or avatar generated as described herein. of themselves as a media overlay.

In other examples, the augmentation system 512 provides a merchant-based publication platform that enables merchants to select a particular media overlay associated with a geolocation via a bidding process. For example, the augmentation system 512 associates the media overlay of the highest bidding merchant with a corresponding geolocation for a predefined amount of time.

The map system 514 provides various geographic location functions and supports the presentation of map-based media content and messages by the messaging client 508. For example, the map system 514 enables the display of user icons or avatars (e.g., stored in profile data 616) on a map to indicate a current or past location of "friends" of a user, as well as media content (e.g., collections of messages including photographs and videos) generated by such friends, within the context of a map. For example, a message posted by a user to the messaging system 504 from a specific geographic location may be displayed within the context of a map at that particular location to "friends" of a specific user on a map interface of the messaging client 508. A user can furthermore share his or her location and status information (e.g., using an appropriate status avatar) with other users of the messaging system 504 via the messaging client 508, with this location and status information being similarly displayed within the context of a map interface of the messaging client 508 to selected users.

The game system 516 provides various gaming functions within the context of the messaging client 508. The messaging client 508 provides a game interface providing a list of available games that can be launched by a user within the context of the messaging client 508 and played with other users of the messaging system 504. The messaging system 504 further enables a particular user to invite other users to participate in the play of a specific game, by issuing invitations to such other users from the messaging client 508. The messaging client 508 also supports both the voice and text messaging (e.g., chats) within the context of gameplay, provides a leaderboard for the games, and also supports the provision of in-game rewards (e.g., coins and items).

The external resource system 518 provides an interface for the messaging client 508 to communicate with remote servers (e.g., Third-party servers 410) to launch or access external resources, i.e., applications or applets. Each third-party server 410 hosts, for example, a markup language (e.g., HTML5) based application or small-scale version of an application (e.g., game, utility, payment, or ride-sharing application). The messaging client 508 may launches a web-based resource (e.g., application) by accessing the HTML5 file from the third-party servers 410 associated with the web-based resource. In certain examples, applications hosted by third-party servers 410 are programmed in JavaScript leveraging a Software Development Kit (SDK) provided by the messaging server system 408. The SDK includes Application Programming Interfaces (APIs) with functions that can be called or invoked by the web-based application. In certain examples, the messaging server 418 includes a JavaScript library that provides a given external resource access to certain user data of the messaging client 508. HTML5 is used as an example technology for programming games, but applications and resources programmed based on other technologies can be used.

In order to integrate the functions of the SDK into the web-based resource, the SDK is downloaded by a third-party server 410 from the messaging server 418 or is otherwise received by the third-party server 410. Once downloaded or received, the SDK is included as part of the application code of a web-based external resource. The code of the web-based resource can then call or invoke certain functions of the SDK to integrate features of the messaging client 508 into the web-based resource.

The SDK stored on the messaging server 418 effectively provides the bridge between an external resource (e.g., applications 1006 or applets and the messaging client 508. This provides the user with a seamless experience of communicating with other users on the messaging client 508, while also preserving the look and feel of the messaging client 508. To bridge communications between an external resource and a messaging client 508, in certain examples, the SDK facilitates communication between third-party servers 410 and the messaging client 508. In certain examples, a WebViewJavaScriptBridge running on a client device 402 establishes two one-way communication channels between an external resource and the messaging client 508. Messages are sent between the external resource and the messaging client 508 via these communication channels asynchronously. Each SDK function invocation is sent as a message and callback. Each SDK function is implemented by constructing a unique callback identifier and sending a message with that callback identifier.

By using the SDK, not all information from the messaging client 508 is shared with third-party servers 410. The SDK limits which information is shared based on the needs of the external resource. In certain examples, each third-party server 410 provides an HTML5 file corresponding to the web-based external resource to the messaging server 418. The messaging server 418 can add a visual representation (such as a box art or other graphic) of the web-based external resource in the messaging client 508. Once the user selects the visual representation or instructs the messaging client 508 through a GUI of the messaging client 508 to access features of the web-based external resource, the messaging client 508 obtains the HTML5 file and instantiates the resources necessary to access the features of the web-based external resource.

The messaging client 508 presents a graphical user interface (e.g., a landing page or title screen) for an external resource. During, before, or after presenting the landing page or title screen, the messaging client 508 determines whether the launched external resource has been previously authorized to access user data of the messaging client 508. In response to determining that the launched external resource has been previously authorized to access user data of the messaging client 508, the messaging client 508 presents another graphical user interface of the external resource that includes functions and features of the external resource. In response to determining that the launched external resource has not been previously authorized to access user data of the messaging client 508, after a threshold period of time (e.g., 3 seconds) of displaying the landing page or title screen of the external resource, the messaging client 508 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 508 adds the external resource to a list of authorized external resources and allows the external resource to access user data from the messaging client 508. In some examples, the external resource is authorized by the messaging client 508 to access the user data in accordance with an OAuth 2 framework.

The messaging client 508 controls the type of user data that is shared with external resources based on the type of external resource being authorized. For example, external resources that include full-scale applications (e.g., an application 406) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

Figure 6:
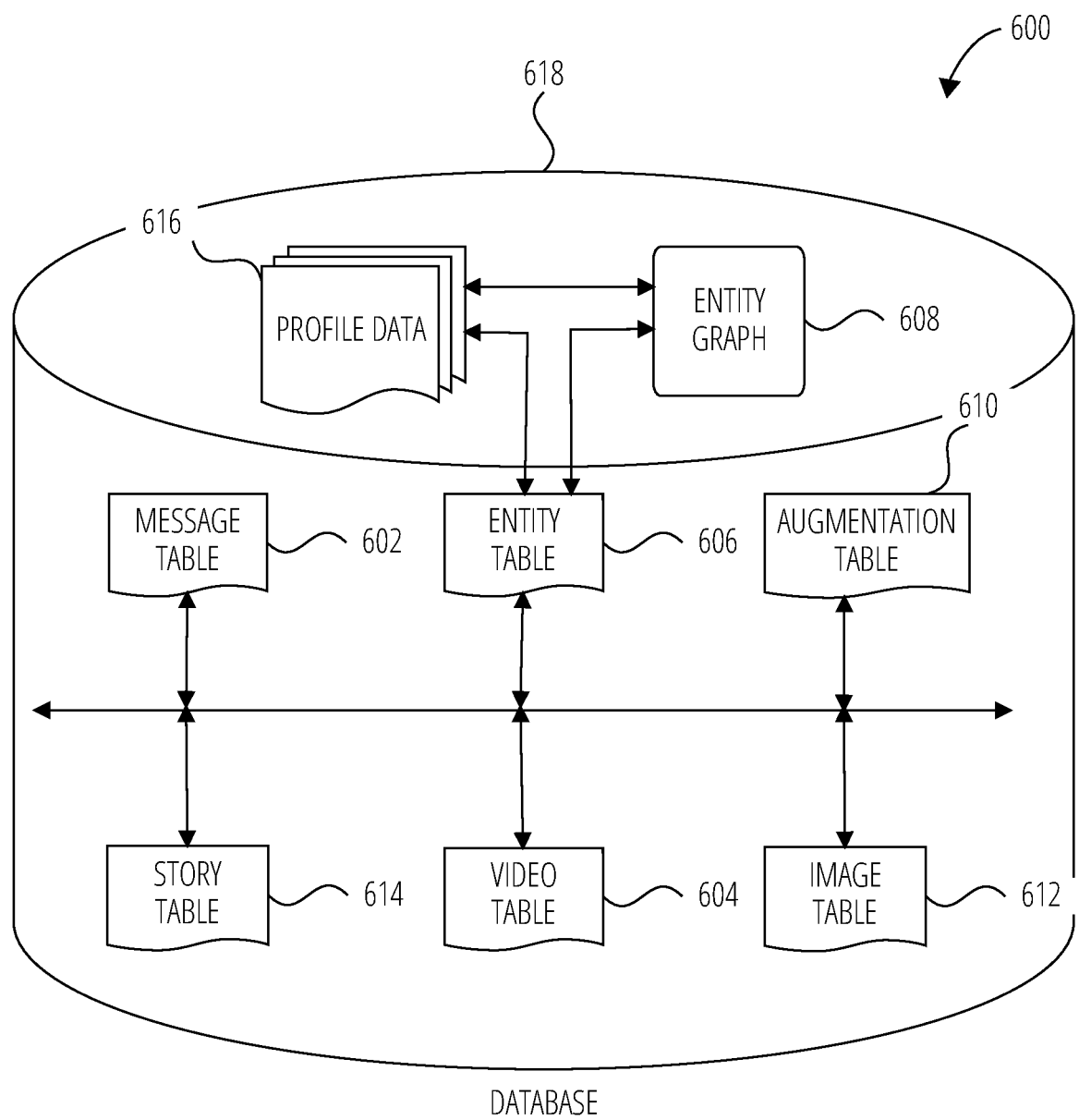
FIG. 6 is a diagrammatic representation of a data structure as maintained in a database, in accordance with some examples.

FIG. 6 is a schematic diagram illustrating data structures 600, which may be stored in the database 618 of the messaging server system 408, according to certain examples. While the content of the database 618 is shown to comprise a number of tables, it will be appreciated that the data could be stored in other types of data structures (e.g., as an object-oriented database).

The database 618 includes message data stored within a message table 602. This message data includes, for any particular one message, at least message sender data, message recipient (or receiver) data, and a payload. Further details regarding information that may be included in a message, and included within the message data stored in the message table 602 is described below with reference to FIG. 7.

An entity table 606 stores entity data, and is linked (e.g., referentially) to an entity graph 608 and profile data 616. Entities for which records are maintained within the entity table 606 may include individuals, corporate entities, organizations, objects, places, events, and so forth. Regardless of entity type, any entity regarding which the messaging server system 408 stores data may be a recognized entity. Each entity is provided with a unique identifier, as well as an entity type identifier (not shown).

The entity graph 608 stores information regarding relationships and associations between entities. Such relationships may be social, professional (e.g., work at a common corporation or organization) interested-based or activity-based, merely for example.

The profile data 616 stores multiple types of profile data about a particular entity. The profile data 616 may be selectively used and presented to other users of the messaging system 504, based on privacy settings specified by a particular entity. Where the entity is an individual, the profile data 616 includes, for example, a username, telephone number, address, settings (e.g., notification and privacy settings), as well as a user-selected avatar representation (or collection of such avatar representations). A particular user may then selectively include one or more of these avatar representations within the content of messages communicated via the messaging system 504, and on map interfaces displayed by messaging clients 508 to other users. The collection of avatar representations may include "status avatars," which present a graphical representation of a status or activity that the user may select to communicate at a particular time.

Where the entity is a group, the profile data 616 for the group may similarly include one or more avatar representations associated with the group, in addition to the group name, members, and various settings (e.g., notifications) for the relevant group.

The database 618 also stores augmentation data, such as overlays or filters, in an augmentation table 610. The augmentation data is associated with and applied to videos (for which data is stored in a video table 604) and images (for which data is stored in an image table 612).

Filters, in one example, are overlays that are displayed as overlaid on an image or video during presentation to a recipient user. Filters may be of various types, including user-selected filters from a set of filters presented to a sending user by the messaging client 508 when the sending user is composing a message. Other types of filters include geolocation filters (also known as geo-filters), which may be presented to a sending user based on geographic location. For example, geolocation filters specific to a neighborhood or special location may be presented within a user interface by the messaging client 508, based on geolocation information determined by a Global Positioning System (GPS) unit of the client device 402.

Another type of filter is a data filter, which may be selectively presented to a sending user by the messaging client 508, based on other inputs or information gathered by the client device 402 during the message creation process. Examples of data filters include current temperature at a specific location, a current speed at which a sending user is traveling, battery life for a client device 402, or the current time.

Other augmentation data that may be stored within the image table 612 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 402 and then displayed on a screen of the client device 402 with the modifications. This also includes modifications to stored content, such as video clips in a gallery that may be modified. For example, in a client devices 402 with access to multiple augmented reality content items, a user can use a single video clip with multiple augmented reality content items to see how the different augmented reality content items will modify the stored clip. This includes generating dances for animations as described herein. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 402 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects. The computer animation can also use the model for generating real time dances for the animated characters.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 402) and perform complex image manipulations locally on the client device 402 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 402.

In some examples, a computer animation model to transform image data can be used by a system where a user may capture an image or video stream of the user (e.g., a selfie) using a client device 402 having a neural network operating as part of a messaging client 508 operating on the client device 402. The transformation system operating within the messaging client 508 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 402 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 614 stores data regarding collections of messages and associated image, video, or audio data, which are compiled into a collection (e.g., a story or a gallery). The creation of a particular collection may be initiated by a particular user (e.g., each user for which a record is maintained in the entity table 606). A user may create a "personal story" in the form of a collection of content that has been created and sent/broadcast by that user. To this end, the user interface of the messaging client 508 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 508, to contribute content to a particular live story. The live story may be identified to the user by the messaging client 508, based on his or her location. The end result is a "live story" told from a community perspective.

A further type of content collection is known as a "location story," which enables a user whose client device 402 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 604 stores video data that, in one example, is associated with messages for which records are maintained within the message table 602. Similarly, the image table 612 stores image data associated with messages for which message data is stored in the entity table 606. The entity table 606 may associate various augmentations from the augmentation table 610 with various images and videos stored in the image table 612 and the video table 604.

Data Communications Architecture

Figure 7:
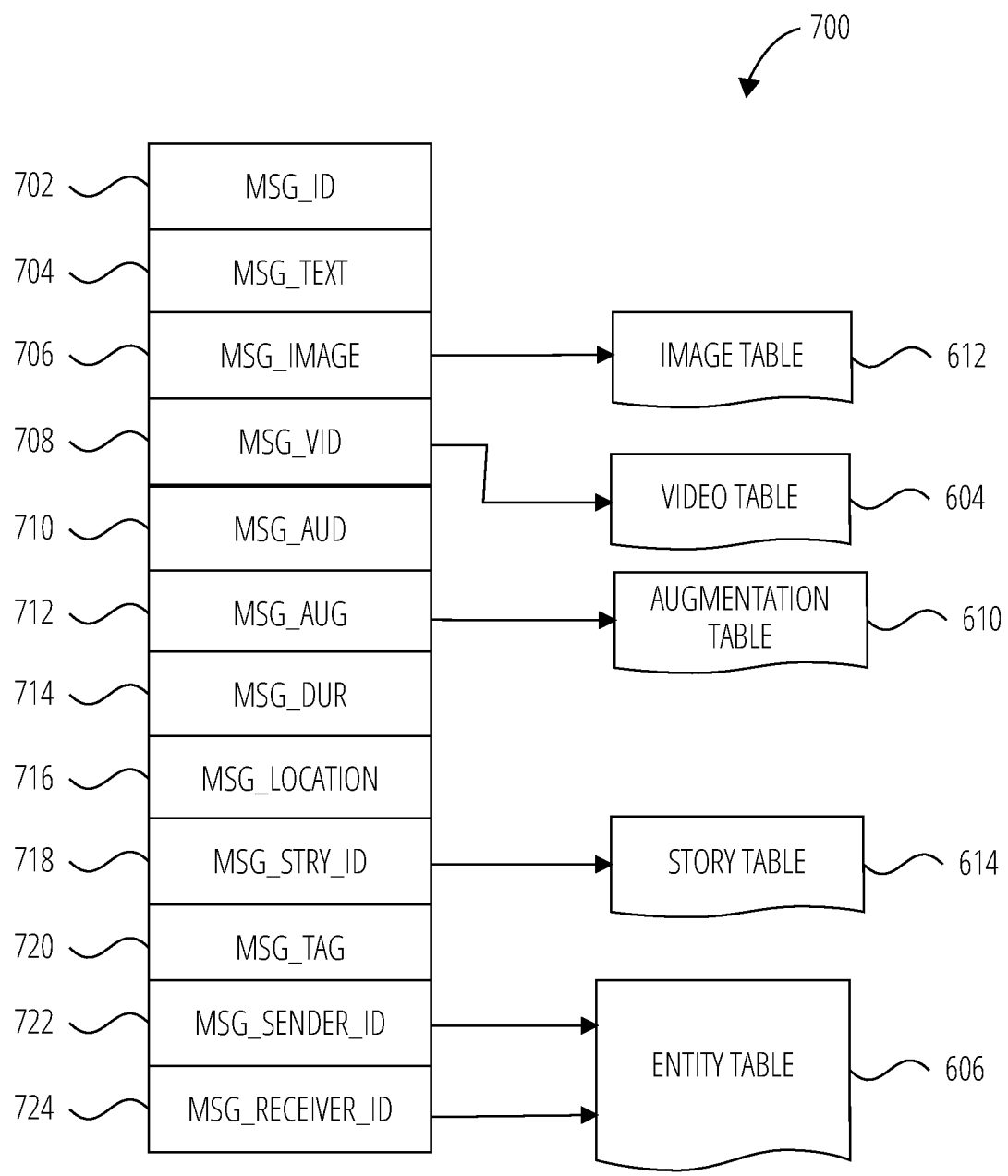
FIG. 7 is a diagrammatic representation of a message, in accordance with some examples.

FIG. 7 is a schematic diagram illustrating a structure of a message 700, according to some examples, generated by a messaging client 508 for communication to a further messaging client 508 or the messaging server 418. The content of a particular message 700 is used to populate the message table 602 stored within the database 618, accessible by the messaging server 418. Similarly, the content of a message 700 is stored in memory as "in-transit" or "in-flight" data of the client device 402 or the application servers 520. A message 700 is shown to include the following example components:

- message identifier 702: a unique identifier that identifies the message 700.
- message text payload 704: text, to be generated by a user via a user interface of the client device 402, and that is included in the message 700.
- message image payload 706: image data, captured by a camera component of a client device 402 or retrieved from a memory component of a client device 402, and that is included in the message 700. Image data for a sent or received message 700 may be stored in the image table 612.
- message video payload 708: video data, captured by a camera component or retrieved from a memory component of the client device 402, and that is included in the message 700. Video data for a sent or received message 700 may be stored in the video table 604.
- message audio payload 710: audio data, captured by a microphone or retrieved from a memory component of the client device 402, and that is included in the message 700.
- message augmentation data 712: augmentation data (e.g., filters, stickers, or other annotations or enhancements) that represents augmentations to be applied to message image payload 706, message video payload 708, or message audio payload 710 of the message 700. Augmentation data for a sent or received message 700 may be stored in the augmentation table 610.
- message duration parameter 714: parameter value indicating, in seconds, the amount of time for which content of the message (e.g., the message image payload 706, message video payload 708, message audio payload 710) is to be presented or made accessible to a user via the messaging client 508.
- message geolocation parameter 716: geolocation data (e.g., latitudinal and longitudinal coordinates) associated with the content payload of the message. Multiple message geolocation parameter 716 values may be included in the payload, each of these parameter values being associated with respect to content items included in the content (e.g., a specific image into within the message image payload 706, or a specific video in the message video payload 708).
- message story identifier 718: identifier values identifying one or more content collections (e.g., "stories" identified in the story table 614) with which a particular content item in the message image payload 706 of the message 700 is associated. For example, multiple images within the message image payload 706 may each be associated with multiple content collections using identifier values.
- message tag 720: each message 700 may be tagged with multiple tags, each of which is indicative of the subject matter of content included in the message payload. For example, where a particular image included in the message image payload 706 depicts an animal (e.g., a lion), a tag value may be included within the message tag 720 that is indicative of the relevant animal. Tag values may be generated manually, based on user input, or may be automatically generated using, for example, image recognition.
- message sender identifier 722: an identifier (e.g., a messaging system identifier, email address, or device identifier) indicative of a user of the Client device 402 on which the message 700 was generated and from which the message 700 was sent.
- message receiver identifier 724: an identifier (e.g., a messaging system identifier, email address, or device identifier) indicative of a user of the client device 402 to which the message 700 is addressed.

The contents (e.g., values) of the various components of message 700 may be pointers to locations in tables within which content data values are stored. For example, an image value in the message image payload 706 may be a pointer to (or address of) a location within an image table 612. Similarly, values within the message video payload 708 may point to data stored within a video table 604, values stored within the message augmentations may point to data stored in an augmentation table 610, values stored within the message story identifier 718 may point to data stored in a story table 614, and values stored within the message sender identifier 722 and the message receiver identifier 724 may point to user records stored within an entity table 606.

Time-Based Access Limitation Architecture

Figure 8:
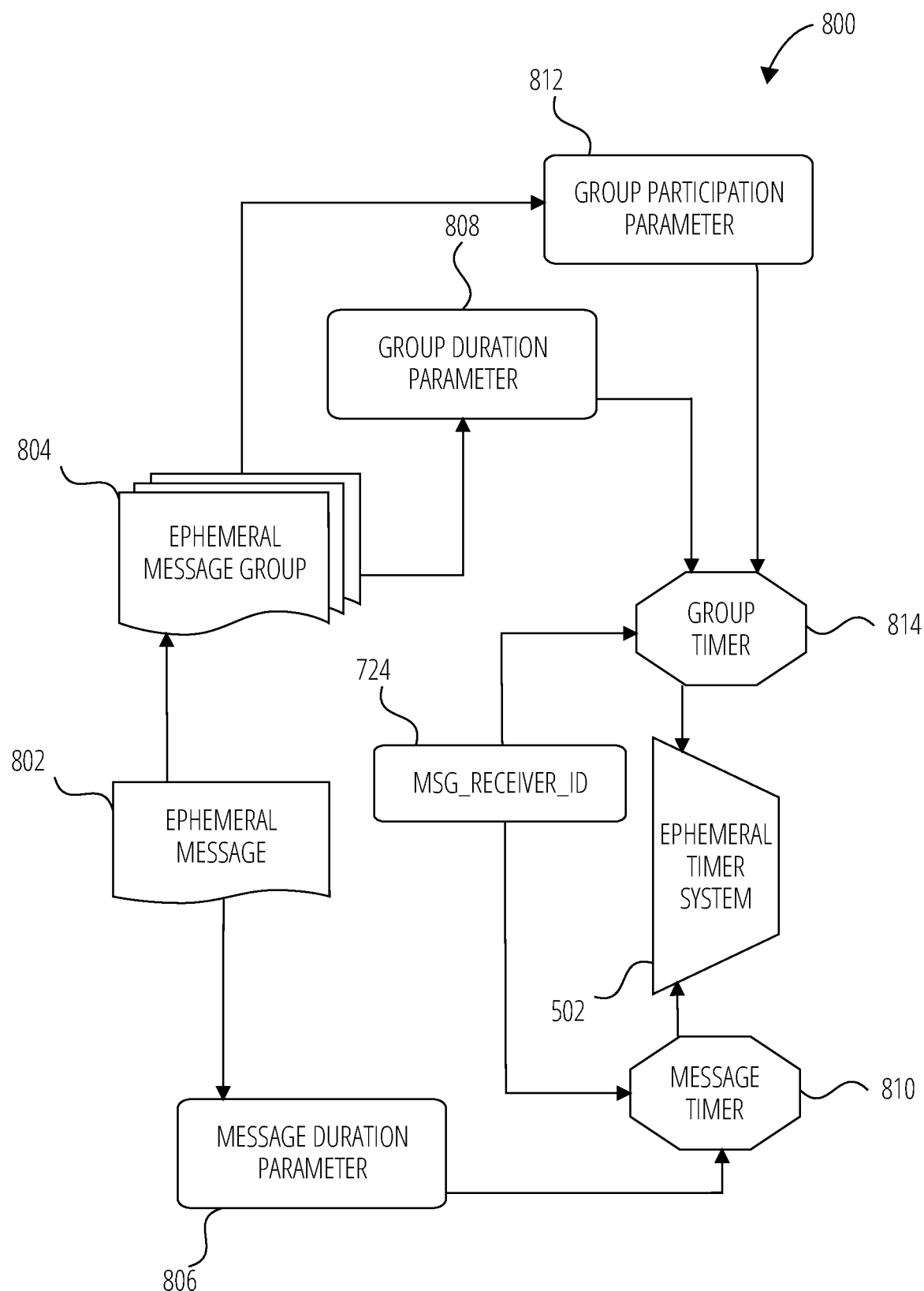
FIG. 8 is a flowchart for an access-limiting process, in accordance with some examples.

FIG. 8 is a schematic diagram illustrating an access-limiting process 800, in terms of which access to content (e.g., an ephemeral message 802, and associated multimedia payload of data) or a content collection (e.g., an ephemeral message group 804) may be time-limited (e.g., made ephemeral). The animated character can be included in an ephemeral message 802.

An ephemeral message 802 is shown to be associated with a message duration parameter 806, the value of which determines an amount of time that the ephemeral message 802 will be displayed to a receiving user of the ephemeral message 802 by the messaging client 508. In one example, an ephemeral message 802 is viewable by a receiving user for up to a maximum of 10 seconds, depending on the amount of time that the sending user specifies using the message duration parameter 806.

The message duration parameter 806 and the message receiver identifier 724 are shown to be inputs to a message timer 810, which is responsible for determining the amount of time that the ephemeral message 802 is shown to a particular receiving user identified by the message receiver identifier 724. In particular, the ephemeral message 802 will only be shown to the relevant receiving user for a time period determined by the value of the message duration parameter 806. The message timer 810 is shown to provide output to a more generalized ephemeral timer system 502, which is responsible for the overall timing of display of content (e.g., an ephemeral message 802) to a receiving user.

The ephemeral message 802 is shown in FIG. 8 to be included within an ephemeral message group 804 (e.g., a collection of messages in a personal story, or an event story). The ephemeral message group 804 has an associated group duration parameter 808, a value of which determines a time duration for which the ephemeral message group 804 is presented and accessible to users of the messaging system 504. The group duration parameter 808, for example, may be the duration of a music concert, where the ephemeral message group 804 is a collection of content pertaining to that concert. Alternatively, a user (either the owning user or a curator user) may specify the value for the group duration parameter 808 when performing the setup and creation of the ephemeral message group 804.

Additionally, each ephemeral message 802 within the ephemeral message group 804 has an associated group participation parameter 812, a value of which determines the duration of time for which the ephemeral message 802 will be accessible within the context of the ephemeral message group 804. Accordingly, a particular ephemeral message group 804 may "expire" and become inaccessible within the context of the ephemeral message group 804, prior to the ephemeral message group 804 itself expiring in terms of the group duration parameter 808. The group duration parameter 808, group participation parameter 812, and message receiver identifier 724 each provide input to a group timer 814, which operationally determines, firstly, whether a particular ephemeral message 802 of the ephemeral message group 804 will be displayed to a particular receiving user and, if so, for how long. Note that the ephemeral message group 804 is also aware of the identity of the particular receiving user as a result of the message receiver identifier 724.

Accordingly, the group timer 814 operationally controls the overall lifespan of an associated ephemeral message group 804, as well as an individual ephemeral message 802 included in the ephemeral message group 804. In one example, each and every ephemeral message 802 within the ephemeral message group 804 remains viewable and accessible for a time period specified by the group duration parameter 808. In a further example, a certain ephemeral message 802 may expire, within the context of ephemeral message group 804, based on a group participation parameter 812. Note that a message duration parameter 806 may still determine the duration of time for which a particular ephemeral message 802 is displayed to a receiving user, even within the context of the ephemeral message group 804. Accordingly, the message duration parameter 806 determines the duration of time that a particular ephemeral message 802 is displayed to a receiving user, regardless of whether the receiving user is viewing that ephemeral message 802 inside or outside the context of an ephemeral message group 804.

The ephemeral timer system 502 may furthermore operationally remove a particular ephemeral message 802 from the ephemeral message group 804 based on a determination that it has exceeded an associated group participation parameter 812. For example, when a sending user has established a group participation parameter 812 of 24 hours from posting, the ephemeral timer system 502 will remove the relevant ephemeral message 802 from the ephemeral message group 804 after the specified 24 hours. The ephemeral timer system 502 also operates to remove an ephemeral message group 804 when either the group participation parameter 812 for each and every ephemeral message 802 within the ephemeral message group 804 has expired, or when the ephemeral message group 804 itself has expired in terms of the group duration parameter 808.

In certain use cases, a creator of a particular ephemeral message group 804 may specify an indefinite group duration parameter 808. In this case, the expiration of the group participation parameter 812 for the last remaining ephemeral message 802 within the ephemeral message group 804 will determine when the ephemeral message group 804 itself expires. In this case, a new ephemeral message 802, added to the ephemeral message group 804, with a new group participation parameter 812, effectively extends the life of an ephemeral message group 804 to equal the value of the group participation parameter 812.

Responsive to the ephemeral timer system 502 determining that an ephemeral message group 804 has expired (e.g., is no longer accessible), the ephemeral timer system 502 communicates with the messaging system 504 (and, for example, specifically the messaging client 508) to cause an indicium (e.g., an icon) associated with the relevant ephemeral message group 804 to no longer be displayed within a user interface of the messaging client 508. Similarly, when the ephemeral timer system 502 determines that the message duration parameter 806 for a particular ephemeral message 802 has expired, the ephemeral timer system 502 causes the messaging client 508 to no longer display an indicium (e.g., an icon or textual identification) associated with the ephemeral message 802.

Machine Architecture

Figure 9:
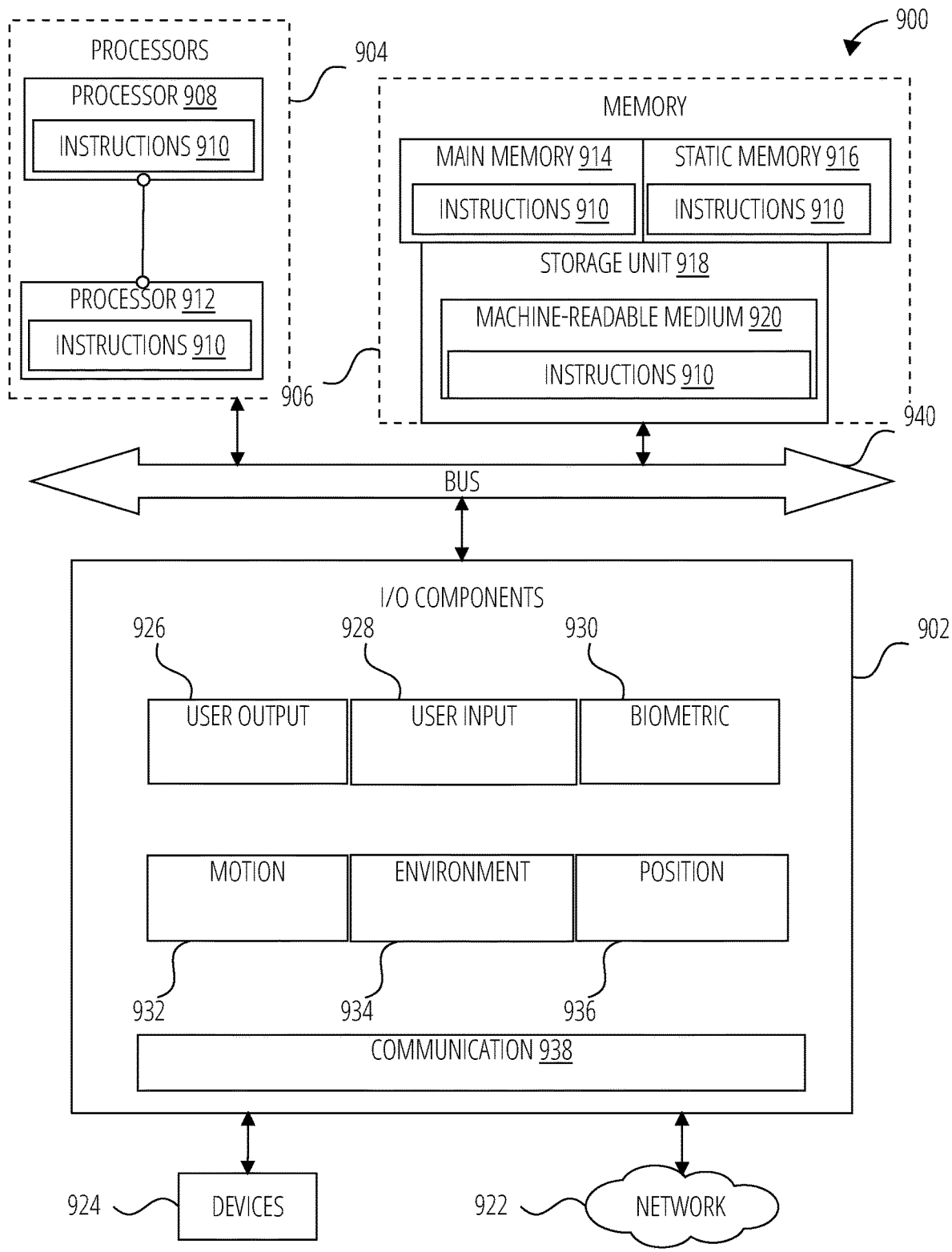
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 910 (e.g., software, a program, an application, an applet, an app, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines that individually or jointly execute the instructions 910 to perform any one or more of the methodologies discussed herein. The machine 900, for example, may comprise the client device 402 or any one of a number of server devices forming part of the messaging server system 408. In some examples, the machine 900 may also comprise both client and server systems, with certain operations of a particular method or algorithm being performed on the server-side and with certain operations of the particular method or algorithm being performed on the client-side. The operations may include instructions for creating a real-time dance sequence for an animated character.

The machine 900 may include processors 904, memory 906, and input/output I/O components 902, which may be configured to communicate with each other via a bus 940. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 914, a static memory 916, and a storage unit 918, both accessible to the processors 904 via the bus 940. The main memory 906, the static memory 916, and storage unit 918 store the instructions 910 embodying any one or more of the methodologies or functions described herein. The instructions 910 may also reside, completely or partially, within the main memory 914, within the static memory 916, within machine-readable medium 920 within the storage unit 918, within at least one of the processors 904 (e.g., within the Processor's cache memory), or any suitable combination thereof, during execution thereof by the machine 900.

The I/O components 902 may include a wide variety of components to receive input, provide output, produce output, transmit information, exchange information, capture measurements, and so on. The specific I/O components 902 that are included in a particular machine will depend on the type of machine. For example, portable machines such as mobile phones may include a touch input device or other such input mechanisms, while a headless server machine will likely not include such a touch input device. It will be appreciated that the I/O components 902 may include many other components that are not shown in FIG. 9. In various examples, the I/O components 902 may include user output components 926 and user input components 928. The user output components 926 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 902 may include biometric components 930, motion components 932, environmental components 934, or position components 936, among a wide array of other components. For example, the biometric components 930 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 932 include acceleration sensor components (e.g., accelerometer), gravitation sensor components, rotation sensor components (e.g., gyroscope).

The environmental components 934 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 402 may have a camera system comprising, for example, front cameras on a front surface of the client device 402 and rear cameras on a rear surface of the client device 402. The front cameras may, for example, be used to capture still images and video of a user of the client device 402 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 402 may also include a 360° camera for capturing 360° photographs and videos. Audio signals from the video can be used in real-time for the creation of current dance pose for an animated character that may be added to the video.

Further, the camera system of a client device 402 may include dual rear cameras (e.g., a primary camera as well as a depth-sensing camera), or even triple, quad or pentad rear camera configurations on the front and rear sides of the client device 402. These multiple cameras systems may include a wide camera, an ultra-wide camera, a telephoto camera, a macro camera and a depth sensor, for example.

The position components 936 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 902 further include communication components 938 operable to couple the machine 900 to a network 922 or devices 924 via respective coupling or connections. For example, the communication components 938 may include a network interface Component or another suitable device to interface with the network 922. In further examples, the communication components 938 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 924 may be another machine or any of a wide variety of peripheral devices (e.g., a peripheral device coupled via a USB).

Moreover, the communication components 938 may detect identifiers or include components operable to detect identifiers. For example, the communication components 938 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 938, such as location via Internet Protocol (IP) geolocation, location via Wi-Fi® signal triangulation, location via detecting an NFC beacon signal that may indicate a particular location, and so forth.

The various memories (e.g., main memory 914, static memory 916, and memory of the processors 904) and storage unit 918 may store one or more sets of instructions and data structures (e.g., software) embodying or used by any one or more of the methodologies or functions described herein. These instructions (e.g., the instructions 910), when executed by processors 904, cause various operations to implement the disclosed examples.

The instructions 910 may be transmitted or received over the network 922, using a transmission medium, via a network interface device (e.g., a network interface component included in the communication components 938) and using any one of several well-known transfer protocols (e.g., hypertext transfer protocol (HTTP)). Similarly, the instructions 910 may be transmitted or received using a transmission medium via a coupling (e.g., a peer-to-peer coupling) to the devices 924.

Software Architecture

Figure 10:
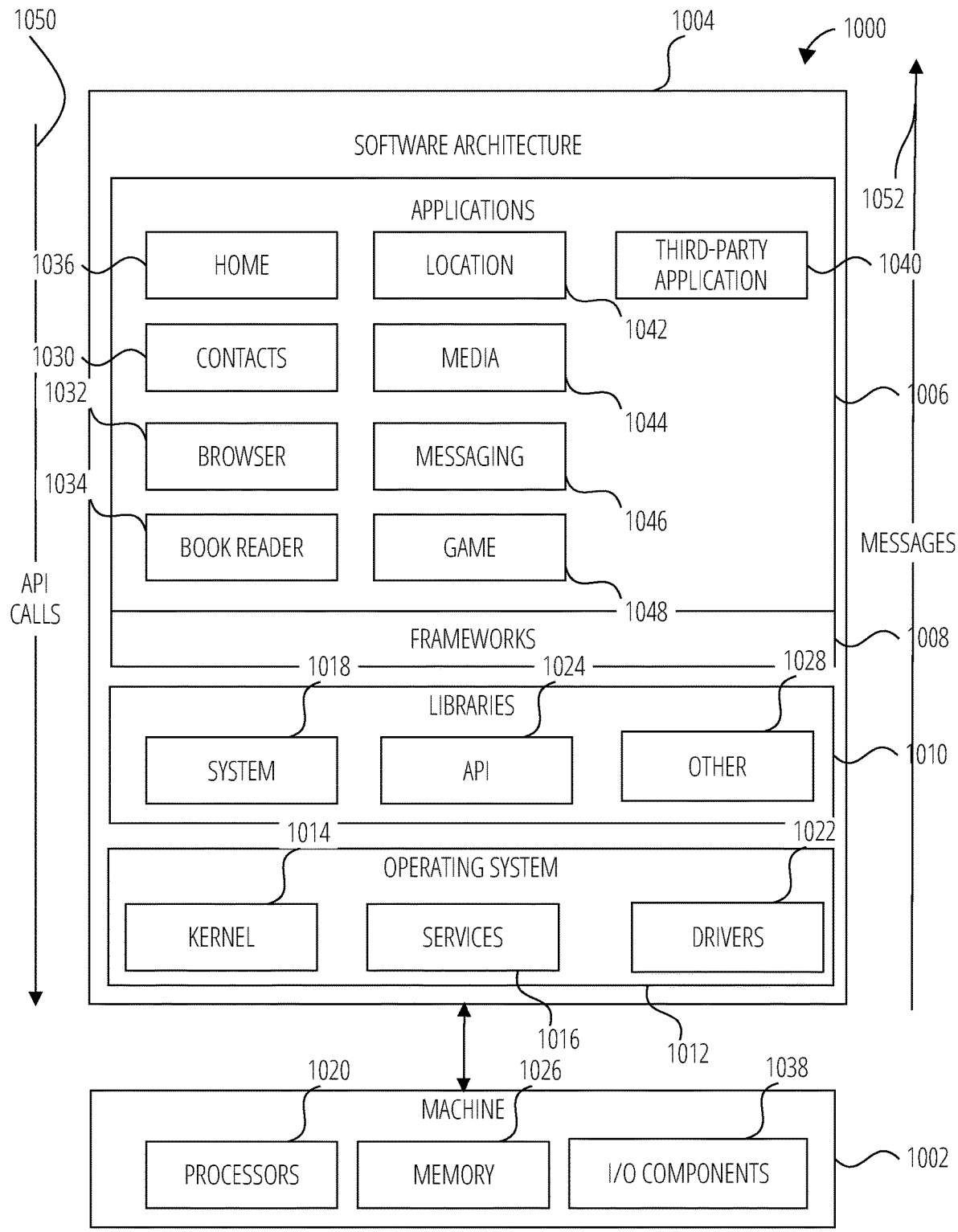
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050. The machine learning model being lightweight can be run on the software architecture 1004.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionalities. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

The description above includes systems, methods, devices, instructions, and computer media (e.g., computing machine program products) that embody illustrative examples of the disclosure. In the description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described above and in the drawings that form a part of this document: Copyright 2016, SNAPCHAT, INC., All Rights Reserved.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Timestamp" in this context refers to a sequence of characters or encoded information identifying when a certain event occurred, for example giving date and time of day, sometimes accurate to a small fraction of a second.

What is claimed is:

1. A method for generating an animated character in dance poses to music, the method comprising:
    generating, by at least one processor, a music input signal based on an acoustic signal associated with the music;
    training, by the at least one processor, an encoding neural network to generate a model output signal including test previous pose data, the music input signal, and test current pose data;
    receiving, by the at least one processor, the model output signal from the encoding neural network;
    generating, by the at least one processor, current generated pose data using a decoding neural network, the current generated pose data being based on previous generated pose data of a previous generated pose, the music input signal, and the model output signal;
    generating, by the at least one processor, an animated character based on the current generated pose data; and
    causing, by the at least one processor, the animated character to be displayed by a display device.

2. The method of claim 1, wherein the encoding neural network and the decoding neural network are based on a conditional recursive neural network model.

3. The method of claim 1, wherein the model output signal is a unit normal distribution or Gaussian distribution.

4. The method of claim 3, wherein the generating of the current generated pose data further comprises:
    generating a mean and a standard deviation of the model output signal.

5. The method of claim 4, wherein the generating of the current generated pose data further comprises:
    sampling a plurality of pose data from poses generated during the training step from of the model output signal.

6. The method of claim 1, wherein the generating of the animated character further comprises:
    associating one or more portions, wherein at least one portion of the one or more portions comprise a set of joints connected to a set of frames used to represent, of the animated character using the current generated pose data.

7. The method of claim 1, wherein generating the music input signal further comprises:
    generating real-time music features based on at least one of Mel Frequency Cepstral Coefficients (MFCC), chromogram, onset, delta values, and beat indicators,
    wherein the music input signal is a music input vector.

8. The method of claim 1, wherein the generating of the animated character further comprises:
    generating a plurality of characters based on the current generated pose data; and
    causing the plurality of characters to be displayed on a display device in an animated sequence.

9. The method of claim 1, further comprising:
    wherein the previous pose data is based on the current pose data.

10. A computing apparatus comprising:
   at least one processor; and
   a memory storing instructions that, when executed by the at least one processor, configure the apparatus to:
   generate a music input signal based on an associated music acoustic signal;
   train, by at least one processor, an encoding neural network to generate a model output signal using test previous pose data, the music input signal, and test current pose data;
   receive the model output signal from the encoding neural network;
   generate a current generated pose data using a decoding neural network, the current generated pose data being based on previous generated pose data of a previous generated pose, the music input signal, and the model output signal;
   generate an animated character based on the current generated pose data; and
   cause the animated character to be displayed by a display device.

11. The computing apparatus of claim 10, wherein the encoding neural network and the decoding neural network are based on a conditional recursive neural network model.

12. The computing apparatus of claim 10, wherein the generating of the animated character further comprises:
   associate one or more portions, wherein at least one portion of the one or more portions comprise a set of joints connected to a set of frames used to represent, of the animated character using the current generated pose data.

13. The computing apparatus of claim 10,
   wherein the test previous pose data is based on the current pose data.

14. The computing apparatus of claim 10, wherein the training of the computing apparatus further jointly trains both a 2D dataset and a 3D dataset; wherein the 2D dataset has at least 25 joints representation for a humanoid figure and the 3D dataset has at least 26 joints representation for the humanoid figure.

15. The computing apparatus of claim 10, wherein the generating of the animated character further comprises:
   generating a plurality of characters based on the current generated pose data; and
   causing the plurality of characters to be displayed on a display device in an animated sequence.

16. A non-transitory computer-readable storage medium, the non-transitory computer-readable storage medium including instructions that when executed by a computer, cause the computer to:
   generate, by at least one processor, a music input signal based on an associated music acoustic;
   train, by at least one processor, an encoding neural network to generate a model output signal using test previous pose data, the music input signal, and test current pose data;
   receive, by at least one processor, the model output signal from the encoding neural network;
   generate, by at least one processor, current generated pose data using a decoding neural network, the current generated pose data being based on a previous generated pose of a previous generated pose, the music input signal, and the model output signal;
   generate, by at least one processor, current generated pose based on the current generated pose data; and
   cause, by at least one processor, the animated character to be displayed by a display device.

17. The non-transitory computer-readable storage medium of claim 16,
   wherein the test previous pose data is based on the current pose data, a mean of the model output signal and a standard deviation of the model output signal.

18. The non-transitory computer-readable storage medium of claim 16, wherein the generating of the animated character further comprises:
   associating one or more portions, wherein at least one portion of the one or more portions comprise a set of joints connected to a set of frames used to represent, of the animated character using the current generated pose data.

19. The non-transitory computer-readable storage medium of claim 16, wherein generate the animated character further comprises, generating a plurality of characters based on the current generated pose data and causing the plurality of characters to be displayed on a display device in an animated sequence.

20. The non-transitory computer-readable storage medium of claim 16, wherein the model output signal is generated by transitioning from initially a forced training to an auto-regressive training over a predetermined number of iterations.

* * * * *

UNITED STATES PATENT AND TRADEMARK OFFICE
CERTIFICATE OF CORRECTION

| | |
|---|---|
| PATENT NO. | : 11,816,773 B2 |
| APPLICATION NO. | : 17/487558 |
| DATED | : November 14, 2023 |
| INVENTOR(S) | : Krishnan Gorumkonda et al. |

Page 1 of 1

It is certified that error appears in the above-identified patent and that said Letters Patent is hereby corrected as shown below:

In the Claims

In Column 30, Line 44, in Claim 5, after "training", delete "step from"

In Column 30, Line 65, in Claim 9, after "claim 1,", delete "further comprising:"

In Column 32, Line 18, in Claim 16, delete "current generated pose" and insert --an animated character-- therefor Signed and Sealed this
Tenth Day of June, 2025

Coke Morgan Stewart
*Acting Director of the United States Patent and Trademark Office*